United States Patent [19]

Crookshanks

[11] Patent Number: 5,099,235
[45] Date of Patent: Mar. 24, 1992

[54] METHOD FOR TRANSFERRING DATA THROUGH A NETWORK OF INTELLIGENT CONTROL STATIONS USING DECENTRALIZED CONTROL TECHNIQUES

[75] Inventor: Rex J. Crookshanks, Palos Verdes Estates, Calif.

[73] Assignee: Hughes Aircraft Company, Los Angeles, Calif.

[21] Appl. No.: 523,493

[22] Filed: May 14, 1990

[51] Int. Cl.$^5$ .............. G06F 13/00; H04B 7/14
[52] U.S. Cl. .................. 340/826; 340/827; 340/825.02; 455/13; 364/DIG. 1
[58] Field of Search .......... 340/826, 827, 825.02, 340/825.52; 455/7, 13; 379/111, 113; 364/200

[56] References Cited

U.S. PATENT DOCUMENTS

| | | | |
|---|---|---|---|
| 4,125,808 | 11/1978 | Graham | 455/7 |
| 4,788,721 | 11/1988 | Krishnan et al. | 340/827 |
| 4,814,980 | 3/1989 | Peterson et al. | 364/200 |
| 4,868,818 | 9/1989 | Madan et al. | 371/9.1 |
| 4,912,656 | 3/1990 | Cain et al. | 340/827 |
| 4,985,832 | 1/1991 | Grodalski | 379/220 |

*Primary Examiner*—Donald J. Yusko
*Assistant Examiner*—Peter S. Weissman
*Attorney, Agent, or Firm*—Gordon R. Lindeen, III; Steven M. Mitchell; Wanda K. Denson-Low

[57] ABSTRACT

A method for transferring data through a network of intelligent control stations (S1-S14) uses decentralized control techniques and associates the intelligent stations (S1-S14) with an addressing scheme which defines a hypercube.

6 Claims, 10 Drawing Sheets

| DIMENSIONALITY OR ORDER OF HYPERCUBE "n" | NUMBER OF DIMENSIONAL PATHS FROM A GIVEN STATION | NUMBER OR "FIRST PRIMITVIE DIAGONAL" PATHS FROM A GIVEN STATION | SUM OF DIMENSIONAL PATHS AND "FIRST PRIMITIVE DIAGONAL" PATHS FROM A GIVEN STATION | NUMBER OF "SECOND PRIMITIVE DIAGONAL" PATHS FROM A GIVEN STATION | SUM OF DIMENSIONAL "FIRST PRIMITIVE DIAGONAL" AND "SECOND PRIMITIVE DIAGONAL" PATHS FROM A STATION |
|---|---|---|---|---|---|
| 2 | 2 | 1 | 3 | — | 3 |
| 3 | 3 | 3 | 6 | 1 | 7 |
| 4 | 4 | 6 | 10 | 4 | 14 |
| 5 | 5 | 10 | 15 | 10 | 25 |
| 6 | 6 | 15 | 21 | 20 | 41 |
| 7 | 7 | 21 | 28 | 35 | 63 |
| 8 | 8 | 28 | 36 | 56 | 92 |
| 9 | 9 | 36 | 45 | 84 | 129 |
| 10 | 10 | 45 | 55 | 120 | 175 |
| 11 | 11 | 55 | 66 | 165 | 231 |
| 12 | 12 | 66 | 78 | 220 | 298 |
| 13 | 13 | 78 | 91 | 286 | 377 |
| 14 | 14 | 91 | 105 | 364 | 469 |
| 15 | 15 | 105 | 120 | 455 | 575 |
| 16 | 16 | 120 | 136 | 560 | 696 |
| 17 | 17 | 136 | 153 | 680 | 833 |
| 18 | 18 | 153 | 171 | 816 | 987 |
| 19 | 19 | 171 | 190 | 969 | 1159 |
| 20 | 20 | 190 | 210 | 1140 | 1350 |

FIG. 8

METHOD FOR TRANSFERRING DATA THROUGH A NETWORK OF INTELLIGENT CONTROL STATIONS USING DECENTRALIZED CONTROL TECHNIQUES

TECHNICAL FIELD

The present invention generally relates to communication networks, and deals more particularly with a data communication network comprised of a plurality of dispersed intelligent control stations which determine an optimum network routing path and transmit data along the optimum network routing path.

BACKGROUND OF THE INVENTION

Typical communications networks normally employ several independent computing stations that communicate with each other according to a predefined scheme, usually under a centralized control. By way of example, in the telephone transmission art, groups of subscribers are routed to a local office. At the local offices the various subscription lines are multiplexed into trunks and are connected with various regional, sectional and primary toll centers. The various centers are interconnected forming a network of centers. Efficient routing of user transmissions is accomplished by monitoring the operational loads of the various centers and redirecting trunk transmissions to maximize network throughput. Various routing schemes are used, one of which involves the use of a central processor. In the central processor scheme, a single control processor monitors the networks centers and directs transmissions through the trunk network so as to maximize the network's throughput while still maintaining transmission quality. Routing schemes which employ a central control processor are efficient, provided that the network does not become too large or heavily used.

Another application of communication networks is found in the cellular mobile telephone art. Cellular technology employs cells which are transmitters and receivers. These cells are placed throughout a large geographic area such that a network of cells is formed. Each cell is capable of receiving or transmitting information from or to any mobile telephone user found within the cell's prescribed territory. All cells within a common grouping communicate their transmissions via trunks to a central Mobile Telecommunications Switching Office (MTSO). From the MTSO, the transmissions are fed into the telephone network. Because the cellular scheme typically involves the use of a central communications office (MTSO), it suffers from drawbacks similar to those found in the telephone transmission art. Consequently, in high use areas the available channels are crowded and the waiting lists for future subscribers are long. Also, communication schemes designed around a single controller are inherently vulnerable because the entire communication systems fails if the central controller is not functional.

The previous examples are typical of applications employing communication systems utilizing a central controller. In some applications it is highly desirable to eliminate the central controller and spread the control responsibilities among a plurality of dispersed intelligent control systems. One application where it is highly desirable to eliminate a central controller is in communication systems that require exceptionally high reliability, such as satellite communication and military communication systems. An isolated failure at one or more control stations in such a system normally will not compromise the integrity of the entire system.

Another application where a decentralized communication scheme is highly advantageous is in expansive communications networks where a single central communications controller can not operate quickly enough to process the necessary routing algorithms in order to effect timely and efficient transfer of information through the network of control stations. When implementing a conventional communications system, the central controller is always designed with sufficient capacity to perform its necessary functions. Normally, in addition to the capacity it necessarily needs, the controller typically possesses excess capacity to accommodate future system needs. As new control stations are appended to the base system, the capacity of the central controller is taxed to a larger and larger degree. The additional taxing on the controller is not directly proportional to the ratio of the additional control systems to the total number of control systems, but rather such taxing grows exponentially and is therefore sometimes referred to as combinatorial explosion. As additional control stations are added, a point is reached when the central controller becomes over taxed and can no longer satisfactorily perform its necessary tasks. By way of example, consider an algorithm which will solve all scheduling problems. With this algorithm it is possible to associate a function $KE^P$ such that for all possibilities P (where P equals the total number of control stations) there are $KE^P$ steps the algorithm must process in order to produce a schedule (i.e. best route available through the network). The exact value of the mathematical constant K is immaterial, because the function $KE^P$ grows too fast, regardless of the value of K, to solve problems with any substantial P by using a central controller. Much work has been done in an attempt to overcome the combinatorial explosion problem as it relates to scheduling, but in general the problem has been thought to be intractable.

SUMMARY OF THE INVENTION

The present invention provides a method for transferring data through a network of intelligent control stations using decentralized control techniques. The novel method includes associating intelligent stations with an addressing scheme, such as the addressing scheme used in defining a hypercube. Each intelligent station is capable of transmitting and receiving status information to and from selected neighboring intelligent stations. Additionally, each intelligent station is capable of transmitting and receiving data to and from selected neighboring stations.

If a given station is selected to exchange status information with a neighboring station, those two stations periodically determine their status and thereafter transmit it to each other. Status information is comprised of two parts: (1) information regarding the station's ability to function within the network (i.e. how busy it is), and (2) information regarding which of the station's selected neighbors the station has presently determined best suited to receive data transmissions.

When data is to be transmitted through the network, it is presented to a first station within the network. The data is segregated into a plurality of data packets so that each data packet transmission will be of uniform duration. The data's destination address is also presented to the first station and appended onto each packet. The destination address is the address of the station which will terminate any further network transmissions of the data packet. The first station determines which of its selected neighboring stations is best suited to receive the data packet, based upon the status information it has received from selected neighboring stations. The first station sends the data packet to its best suited neighboring station. The station receiving the data packet determines which of its selected neighboring stations are best suited to next receive the data packet. This determination is made using the same steps as were used by the first station. This process of receiving data packets, determining the best suited neighboring station, and transferring the data packet to the best suited neighboring station continues from station to station until the data reaches the destination station.

In one aspect of the invention, a method of communication between a first and a second station is provided, both the first and the second station being in communication with a plurality of other stations, the method comprising the steps of (a) assigning a plurality of addresses to the first, the second, and to each of the plurality of other stations, respectively uniquely identifying the stations; (b) generating a set of data to be communicated from the first station to the second station; (c) associating the unique address of the second station with the data set; (d) causing the first station to select one of the plurality of other stations; (e) communicating the data set and the unique address associated therewith to the selected station; and (f) causing the selected station to communicate the data set to the second station.

BRIEF DESCRIPTION OF THE DRAWINGS

FIG. 8 is a table of hypercube dimensionality from two through twenty and the respective summation of dimensional, first primitive and second primitive diagonals.

DETAILED DESCRIPTION OF THE INVENTION

The present invention generally relates to a method for transferring data through a network of intelligent control stations using decentralized control techniques. A description of the networking portion of this invention will be followed by a description of the method used to achieve transmission of data through the network using intelligent control stations and decentralized control techniques.

A Network of Control Stations

Figure 1:
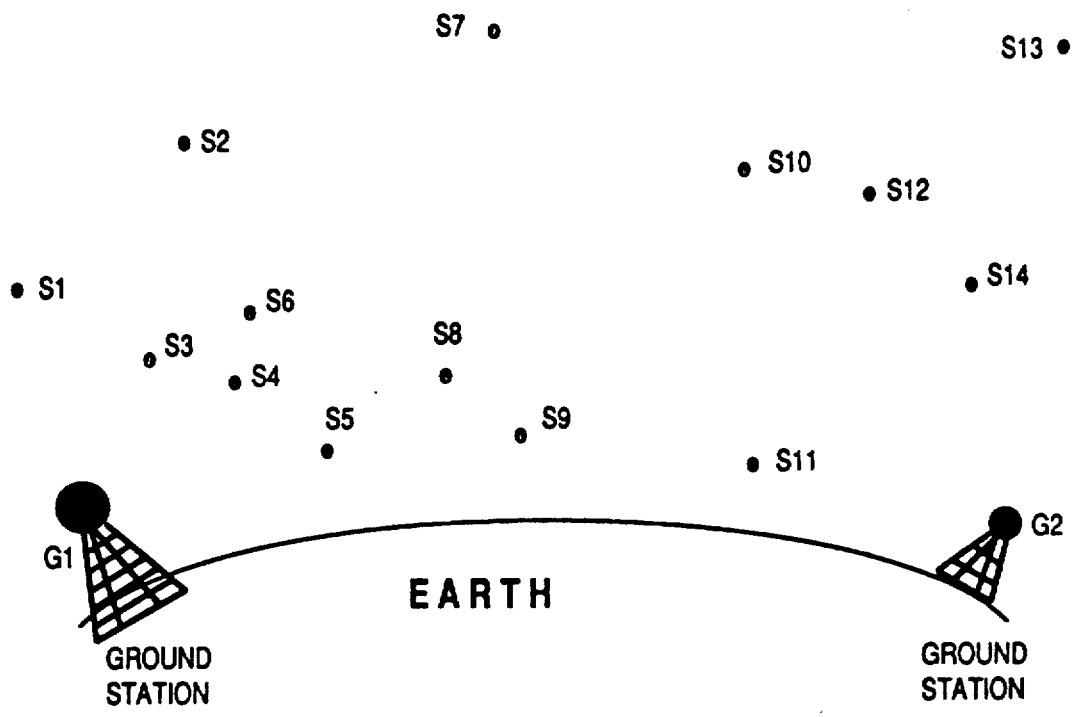
FIG. 1 is a diagram depicting fourteen space-borne stations and two ground stations.
Figure 2:
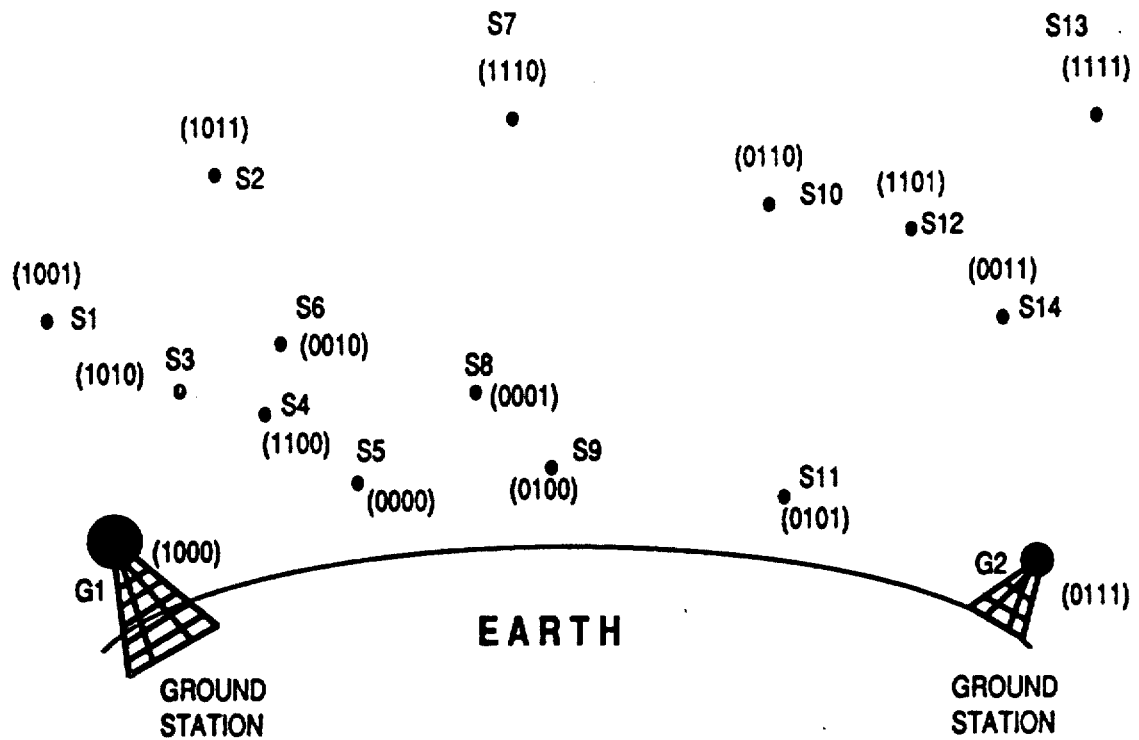
FIG. 2 is a diagram depicting fourteen space-borne stations, and their respective binary communications addresses, and two ground stations and their respective binary communications addresses.

In the case of the illustrated embodiment, the invention has been applied to a satellite communications network, and in this connection, reference is first made to FIG. 1 which depicts a communications arrangement involving ground stations G1 and G2 which are to be linked so that they can conduct two way communications. Because of the geographic distance, and other possible factors, it is not possible to transmit directly between G1 and G2, consequently several space born stations, namely satellites S1 through S14 must be used to link communications between ground stations G1 and G2. Since it is not always feasible or desirable for every satellite to communicate with every other satellite, a communications linking scheme must be established whereby each satellite communicates with a select number of its neighboring satellites. Several linking schemes or topologies can be applied to this network. According to the present invention, a hypercube topology is applied. In order to apply the hypercube topology to the network of stations, addresses must be associated with each satellite and ground station. FIG. 2 shows each station and its respective binary address. Binary addressing has been chosen because of its ease of use within digital computers; however, other addressing schemes may also be used. The binary addresses may be assigned to the satellite stations S1-S14 and ground stations G1, G2 according to any desired scheme.

In order to determine the dimensionality of the hypercube that has the sixteen stations of FIG. 2 as a projection, the following formula is used:

$$D = \log_2 (S + G) \qquad (1)$$

where:

D = the dimensionality of the hypercube. (If D does not calculate to an integer it must then be rounded up to the next highest integer ... i.e. if D=4.123 then the dimensionality of the hypercube would be 5.)

S = total number of space born stations.

G = total number of ground stations.

Figure 3:
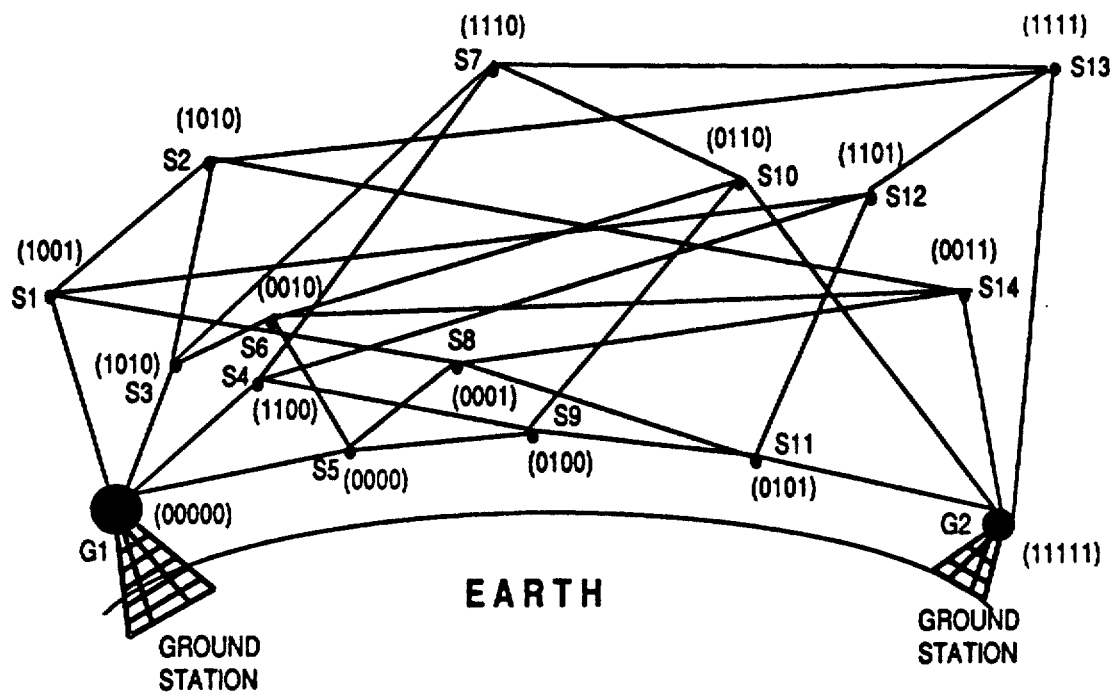
FIG. 3 is a diagram showing a hypercube model of a network of stations intercommunicating over the hypercube's dimensional diagonals.

Relating the above formula (1) to FIG. 2, $D = \log_2 (S + G)$ $D = \log_2 (14 + 2)$ $D = 4$ The above thus reveals that a four-dimensional hypercube is the proper dimension in order to conform the station distribution to the hypercube topology. More importantly, a four dimensional hypercube defines the minimum number (four in the case of a four dimensional hypercube) of bi-directional communication links needed at each station such that any station is accessible to any other station in four or less transmissions. FIG. 3 shows four bi-directional communication links associated with every station. The links are shown as straight lines which interconnect the stations. If, the present example would have consisted of more than sixteen stations, formula (1) would still be applicable to determine the minimum number of bi-directional communication links which would be needed at each station.

The bi-directional links shown in FIG. 3 interconnect stations that have addresses which differ by only one binary position. For example, station 1001 is linked to station 1011. The only difference between these two addresses is that station 1001 has a "0" in the third right most position, while station 1011 has a "1" in its third right most position. Addresses which differ by only one binary position are said to represent stations which are one indices away from each other. FIG. 3 demonstrates that all of the bi-directional communication links interconnect stations whose addresses differ by one indices.

FIG. 3 will be used to demonstrate how data is transmitted through a hypercube network. Assume that ground station G1 (the transmitting station) had a pocket of data to transmit to ground station G2. Ground station G1 begins this task by sending the data pocket and the pocket's destination address (0111 in this case) to one of the four satellites one indices away, i.e., S1–S4. By way of example, suppose ground station G1 sent the data pocket to satellite S4. Satellite S4 then compares its address with the destination address 0111 (G1) and complements one of the present address indices bits 1100 to match the corresponding indice bits in the destination address. In this case, when the two addresses are compared, 1100
0111 the only bit that can not be complemented is the second leftmost bit. Any one of the remaining bits may be complemented under this scheme. Assuming, for example, that satellite S4 complements the left-most bit (i.e., a transformation of 1100 to 0100). The satellite which will next receive the data packet is satellite S9 which has address number 0100. The process then continues with satellite S9 comparing its address to that of the packet's destination address as follows:

0100
0111 and complements one bit of its address in a way that closer conforms its address to the destination address. Suppose here that satellite S9 complements its right most address bit (i.e. a transformation of 0100 to 0101). The next satellite to receive the data packet is satellite S11 whose address is 0101. Now satellite S11 has no choice of which bit to complement; the second from the right most bit is the only remaining bit which differs from the destination address. Satellite S11 complements this remaining bit (i.e. a transformation of 0101 to 0111) and sends the data packet to the destination station G1 (0111). The packet arrives at station G2, and no more network transmissions are made because the destination address (0111) matches the address (0111) of the station (G2) in possession of the data. In this example it is important to note that regardless of the route taken by the data packet, it must always make four transmission "jumps" before arriving at its destination station. This assumes that the data always travels along a minimum path. By conforming the intermediate address to the destination address one bit at a time, a minimum data path will always be guaranteed. Likewise in a five dimensional hypercube the data will never make more than five transmission jumps when travelling between source station and destination station along a minimal path. And, accordingly, in a ten dimensional hypercube all stations are accessible to all other stations by way of ten or less intermediate stations. It can be seen that it is possible to extend the hypercube topology to any number of stations. An "n" dimensional hypercube can always be configured for a given number of stations, where "n" represents the number of bi-directional transmission paths associated with each station.

Given all of the attractive features of the hypercube topology, even the ease of routing by complementing one indices at a time, there are applications where it may be desired to have more than "n" connections for an "n" dimensional hypercube. Such applications would be those where data transmission speed is a major factor. In applications where data transmission speed is a major factor, dimensional and higher order diagonals could be used for data transmission, thereby giving the hypercube network a parallel-like transmission capability. By using dimensional and higher order diagonals for data transmission, a greater degree of robustness and anti-interference capability is also achieved. This greater robustness is possible because the more communication links between neighboring stations, the less dependent a station is on any one of its neighbors.

Still other applications would include those where information regarding the status of neighboring stations was fed back along higher order diagonals. This status feedback information could be used by the receiving stations to periodically update the information they have on each of their neighbors' state of readiness or state of ability to relay transmissions. A station can then use the updated status information regarding its neighbors' state of readiness when determining which neighboring station is better able to handle any future data transmissions (i.e. data will not be relayed to the busiest neighboring stations if at all possible). As feedback information is sent from station to station, each station adapts its future transmission decisions in a way which will eliminate placing an undue or unequal burden on any one neighboring station. If any one station becomes unequally burdened, this will be reflected in the status information it is sending to its neighbors. The neighbors will then redirect data transmissions in a way which will equalize the data transmission load amongst the neighboring stations. This self-allocation of network resources is a novel feature of the disclosed invention because it guarantees that the network data transmissions will always be as efficient as possible under any set of static or dynamic conditions. Where an above-mentioned application exists, a "n" dimensional hypercube network would be implemented with both dimensional and primitive diagonal paths.

Figure 4:
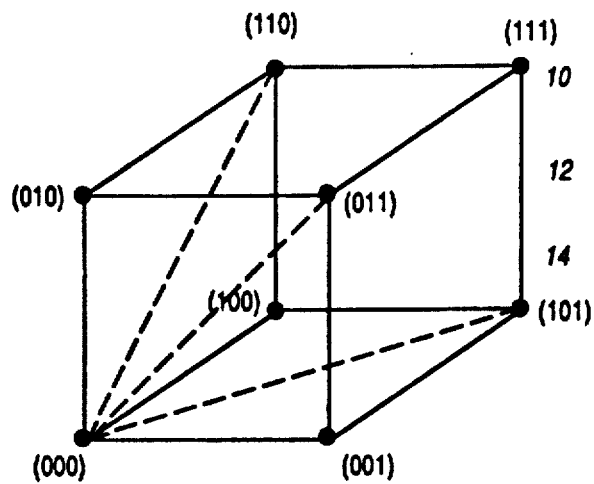
FIG. 4 is a diagrammatic perspective view showing a three-dimensional hypercube with all dimensional diagonals and selected first primitive diagonals.

Referring now to the three dimensional hypercube shown in FIG. 4 it is easy to demonstrate what primitive diagonals are and how they differ from dimensional paths previously dealt with. FIG. 4 shows eight stations 10, shown as black circles, interconnected by two types of bi-directional transmission links, dimensional transmission links 12 shown as solid lines, and first primitive diagonal transmission links 14 shown as dashed lines. As previously demonstrated with formula (1), a hypercube having eight stations, must have at least $\log_2 (8)$ or 3 dimensional communications links associated with each station in order to guaranty that any station's transmissions may reach any other station without traveling across more than $\log_2 (8)$ transmission "links". The hypercube in FIG. 4 shows the first primitive diagonal transmission links associated with station 000. A first primitive diagonal transmission link is defined as a link between two stations which have addresses differing by two indices. For example, station 011 lies along a first primitive diagonal of station 000 because 011 differs from 000 in two binary positions.

Figure 5:
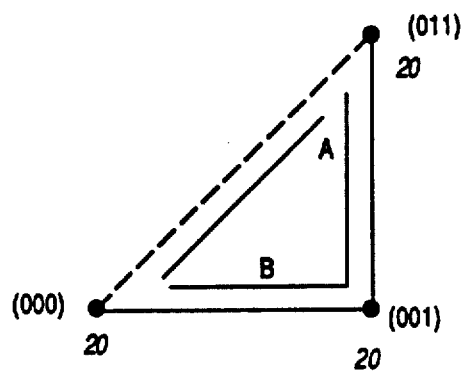
FIG. 5 is a diagram showing the triangular communication link established when dimensional and first primitive diagonals are used.
Figure 6:
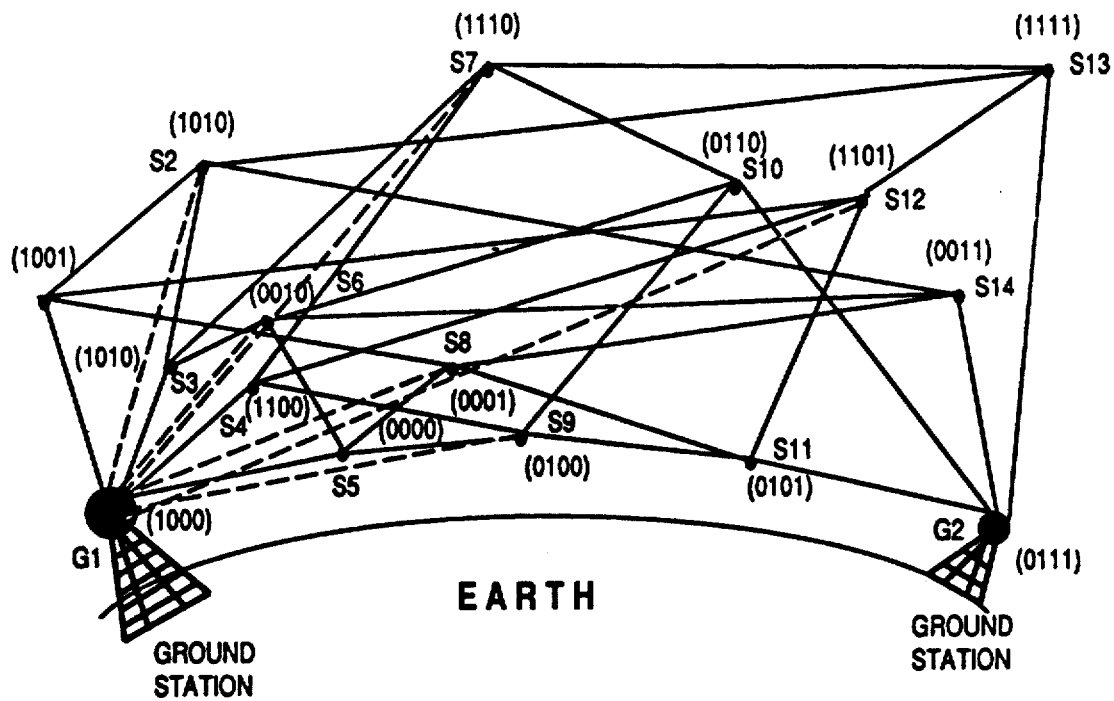
FIG. 6 is a diagrammatic view showing a hypercube model of a satellite communications network which uses dimensional and first primitive diagonals.

Designing the network so that the stations communicate along both dimensional and first primitive diagonals has the desirable advantage of enabling each station to send and receive information to a first primitive diagonal neighboring station in one half the time it would take if just dimensional diagonals are used. This desirable characteristic allows: (1) greater control over arrival times than is otherwise possible, and (2) greater utilization of all nodes. The characteristic of allowing greater control over arrival times is illustrated by the "triangular" shape of the stations and their communication links. This "triangular" shape is best shown in FIG. 5. Suppose it takes $t_0$ seconds to transmit from one station 20 to any other station 20. If data is to be transmitted from station 000 to station 011 it can be sent over two possible transmission routes. It could be sent over route A, which would take $t_0$ seconds. It could however be sent over route B. This would take two times $t_0$ seconds because it must first be routed to station 001 before it can be transmitted to station 011. If first primitive diagonals in addition to dimensional diagonals were implemented in the satellite system shown in FIG. 3, the network would take on a higher degree of complexity, but in turn it would function more efficiently and it would be more robust. FIG. 6 shows the satellite communications network of FIG. 3 with all of ground station #1's first primitive communication diagonals implemented (shown as dashed lines). It can be easily seen from FIG. 6 that if a system uses both dimensional and first primitive communications diagonals to transmit data over, a parallel type of communications architecture can be achieved (i.e. data travelling along dimensional diagonals simultaneously with data travelling along first primitive diagonals). If more speed or robustness is needed beyond that which is feasible with a system using dimensional and first primitive diagonals, the second, third, and higher order primitive diagonals can be used.

Implementing higher order diagonals can also serve to give the network stations status information about their "higher order" neighbors. If higher order diagonals are used to transmit status information between stations, more sophisticated and efficient routing algorithms can be used. This higher order feedback information will be used to apprise a station of the status of its higher order neighboring stations. By having a broad range of status information (i.e. dimensional, first primitive, and second primitive neighbors) regarding a neighboring station's readiness to function within the network, the stations can then be programmed to anticipate communication bottlenecks and reroute data communications in a way which will minimize data flow congestion. In its preferred embodiment, the hypercube network herein disclosed functions most stably if the status transmission paths and the data transmission paths are arranged as follows: for every order of diagonal, n, implemented for data transmission, then at least n+1 order of diagonals should be implemented for status transmission. For example, if a network is designed to transmit over dimensional diagonals only, then its dimensional diagonals and its first primitive diagonals should be used for status transmission. Or, in another example, if a robust system is designed where dimensional and first primitive diagonals are used for data transmission, then at least the dimensional, first primitive, and second primitive diagonals should be implemented for status feedback purposes. By having status always travel on one higher order diagonal than is traveled by data, status information is guaranteed to travel faster than data between higher order stations. This principle can be easily demonstrated with the aid of FIG. 6. Suppose data and status information travels between any two dimensional stations in $t_0$ seconds. Also suppose that status information also takes $t_0$ seconds when traveling between first primitive diagonal stations. In FIG. 6, if data is to be routed from station 1000 through station 1110, it must first travel through either station 1010 or station 1100. From one of these two stations, it will be routed to station 1110. The time it takes data to travel from station 1000 to either station 1010 or 1100 has been defined as $t_0$ seconds (they both lay along a dimensional diagonal of station 1000). It takes an additional $t_0$ seconds for data to travel to station 1110, making the total trip from station 1000 to station 1110 $2*t_0$ seconds long. But note that since we have implemented first primitive diagonals for the purposes of status information transmission (shown as dash lines), status information flows between station 1110 and 1000 in $t_0$ seconds—which is ½ the time it takes data to travel between the same two stations. By using this "triangulation" scheme whereby one higher order of diagonals is used exclusively for status transmission purposes, the status of neighboring stations is known before the data can arrive at those same neighboring stations. This ability to send status information through the network faster than data can be sent reduces the possibility of data loss by the network when stations become nonfunctional or overloaded. Reduction of data loss is made possible by this scheme because the status information is fed back fast enough to allow the neighboring stations to deflect data transmissions around the inoperable or overloaded stations.

For small systems, such as shown in FIG. 4, not many primitive diagonals can be used before all possible interconnects are exhausted. However, these concepts can be generalized for an "n" dimensional hypercube in which the utilization of the first and second primitive diagonals do not exhaust all possible connections. If "n" is the dimension of the hypercube, and "x" is the number of indices changed along a single bi-directional transmission path, then the number of paths associated with each station is given by the binomial coefficient (x) where:

$$\binom{n}{x} = \frac{n!}{x!(n-x)!} \qquad (2)$$

Therefore the number of *dimensional* diagonals links associated with each station in an "n" dimensional hypercube is:

$$\binom{n}{1} = \frac{n!}{1!(n-1)!} = n \quad (3)$$

Which merely confirms that which was stated earlier, that being a "n" dimensional hypercube has "n" dimensional diagonals associated with each station. The number of *first primitive diagonals* associated with each station of an "n" dimensional hypercube is:

$$\binom{n}{2} = \frac{n!}{2!(n-2)!} = \frac{(n-1)(n)}{2} \quad (4)$$

And similarly, the number of second primitive diagonals associated with each station of an "n" dimensional hypercube is:

$$\binom{n}{3} = \frac{n!}{3!(n-3)!} = \frac{(n-2)(n-1)(n)}{6} \quad (5)$$

It can be seen that applying formula (4) to our four dimensional hypercube network shown in FIG. 6 that, the number of first primitive diagonals associated with each station is:

$$\binom{4}{2} = \frac{(4-1)(4)}{2} = \frac{(3)(4)}{2} = 6 \quad (4)$$

Six first primitive communication diagonals are associated with every station. In FIG. 6, the dimensional diagonals of all sixteen stations are shown, but for clarity only the first primitive diagonals of ground station #1 are shown. Although not shown, all of the space born stations along with ground station #2 each have six associated first primitive diagonals.

Figure 7:
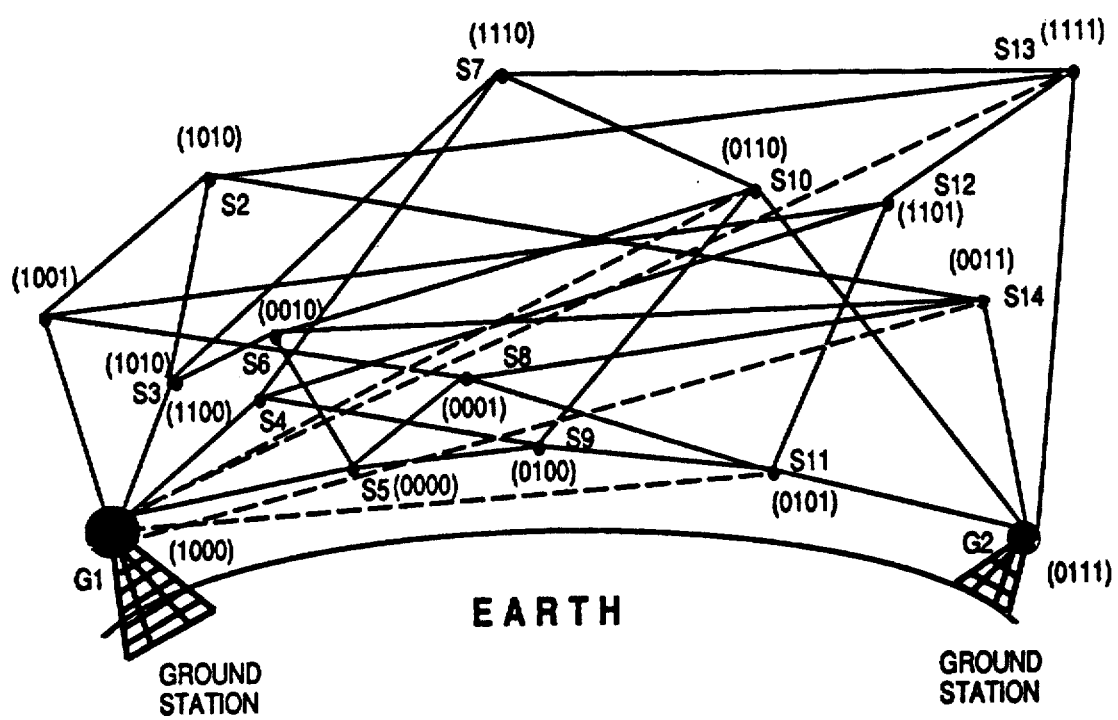
FIG. 7 is a diagrammatic view showing a hypercube model of a satellite communications network which uses dimensional and second primitive diagonals.

The above example can be carried to the next level of diagonals—second primitive diagonals. In FIG. 7, the second primitive diagonals are indicated by dash lines that connect ground station #1 to stations three indices away. To maximize clarity, only stations 1000 second primitive diagonals are shown. In FIG. 7, the number of second primitive diagonals is given by formula (5):

$$\binom{4}{3} = \frac{(n-2)(n-1)(n)}{6} = \frac{(4-2)(4-1)(4)}{6} = 4 \quad (5)$$

From FIG. 7 it can be seen that each station has associated with it four second primitive diagonals.

FIG. 8 is a tabulation of the dimensional, first primitive diagonal, and second primitive diagonal links associated with a station in a "n" dimensional hypercube. FIG. 8 shows these tabulated links beginning with a 2 dimensional hypercube. The number of stations in FIG. 8 range from $2^2$ (or 4 in the case of a two dimensional hypercube) to $2^{20}$ (or 1,048,576 in the case of a twenty dimensional hypercube). Although the implementation of a full hypercube (i.e. one which uses dimensional and all higher order diagonals) would no doubt result in a very robust communications system, it is often times not necessary or feasible to do so. For example, even if it was technologically feasible to implement a full fifteen dimensional hypercube, few communication systems could warrant the associated complexity, and cost of such a robust system. In such a system each station would be in direct communication with $2^{15}-1$ (or 32,767) neighboring stations. The cost of the necessary communications hardware alone would be prohibitive enough to seriously question whether all of the communication links are necessary.

Although the above example may be extreme, it does illustrate the point that in most applications an implementation of a full hypercube is almost always unnecessary; and when this is the case, the hypercube station links must be thinned or depopulated such that the hypercube network can still function without undue loss of robustness. The degree to which a hypercube network is depopulated will directly impact the level of decision making that will take place at each intelligent station (i.e. the greater the population of communications links between stations, the fewer number of intermediate stations will be used in network transmissions).

Decentralized Control of Network Transmissions

In order for a communications network to successfully function, there must be a systematic approach for determining how to route data through the network. In the case of the present invention, the intelligence necessary to accomplish network data routing does not reside in a central computer but rather each network station decides which of its available neighbors is best suited to next receive the data packet. Each time the data is transmitted to a best suited neighbor, the data moves one step closer to its destination address. In using this type of decentralized scheme, several important factors become evident: 1) the real power of a decentralized control scheme is that each station monitors the status of only the stations in its immediate environment when deciding which of its neighbors is best suited to receive the data transmission; 2) the combinatorial explosion problem which always limits centrally controlled networks, will never come into play in a decentralized control scheme provided the individual stations have sufficient computational speed to process and act upon the incoming status information from the neighboring stations; 3) and, as a corollary to 2), the maximum number of network communication stations is not constrained by the computational power of a single central controller. Before the aforementioned decentralized control scheme can be detailed, a brief explanation of Artificial Intelligence (A.I.) is necessary. Once A.I. has been introduced, its direct application to the decentralized control strategy herein disclosed will be readily apparent.

A.I. in is simplest form consists of logical statements such as "if x then y or else z" where x may be a test for a certain condition (i.e. if the water temperature is above 112 degrees F.) or x may be the result of a previous "if x then y or else z" statement (i.e. if the red light is on then the water temperature is above 112 degrees F.). One or two "if . . . then . . . else . . . " statements hardly offer the logical assimilation necessary to solve large, complex problems. But when several hundred or several thousand of these statements are properly interlinked, they can be used to quickly solve certain classes of complex problems.

Although A.I. in its simplest form, is fairly easy to implement, it lacks the type of flexibility often needed to solve "real life" problems. One of the problems encountered when applying the simple "if . . . then . . . else" rules, is often times, real life applications can be not be categorized into the yes/no, true/false format mandated by simple rules. One way to solve the rigidity of the simplistic "if x then y else z" rules is to assign weighting factors to each x, y, and z variable. By assigning weighting factors to the x, y, and z variables, it is then possible to determine not only the truth or falsity of the conditions, but also the degree to which the condition is true or false. These weighting factors can be derived in several different ways but most often they are compiled from probabilistic studies and data compiled from experts in the relevant field. To date, A.I. programs fall into three general categories 1) knowledge programs, 2) update knowledge programs, and 3) inference programs.

The knowledge program generally consists of a large number of input conditions, output conditions, and a number of logical operators which link a given input or inputs to a given output. In order for these logical operators to collectively operate as a single intelligent system, they must be logically combined, or linked so as to form a cooperating whole. For all but the most trivial A.I. systems, the linking or training process is itself extremely involved and is performed by very specialized software. The first time an A.I. system is trained, certain logical inconsistencies may result. Logical inconsistencies result when identical input conditions result in opposite output conditions. Logical inconsistencies can often be overcome by using weighting factors. Once the logical inconsistencies are eliminated (or reduced to an acceptable level), the range of inputs is checked to determine if it is complete. Additionally, the range of possible outputs are checked to determine if they can all be realized by some combination of input conditions. Finally, if any above inconsistencies are too great, the person designing the A.I. system is notified. Generally, the designer can remedy the inconsistencies by either appending new inputs or deleting selected outputs. Once the A.I. program is successfully trained, it is ready to be used. Although knowledge programs may be designed to let the user known when an input condition exists which is beyond the domain of its training, it must be retrained if additional inputs are to be appended onto the existing A.I. system. No retraining, however, is needed with update knowledge programs.

Update knowledge programs do everything that a knowledge system does, but in addition they can be expanded without retraining. This retraining capability is commonly referred to as the "learn while performing" attribute. "Learn while performing" generally means that to a limited degree the set of inputs or outputs can be altered from that which the system was trained for, without necessitating a retraining of the A.I. program.

The inference program has all of the capability of the update knowledge program, and in addition it probabilistically (or randomly) develops new logical relationships between inputs and outputs and then tests its hypotheses for consistency and completeness. Inference programs attempt to "learn" from past performance in much the same way as a human learns. Inference programs can implement what they learn in two possible ways: 1) they can create new relationships (i.e. if x then y else z) which take advantage of the newly acquired information (conversely, they can eliminate old relationships which no longer are applicable), and 2) they can modify existing relationships, when specific solutions cannot otherwise be found.

To date, most work is being done with knowledge programs, some effort is being directed toward developing inference programs and update knowledge programs.

One last point regarding A.I. needs explaining before the role of A.I. can be understood as it applies to decentralized network controls. Implicit in A.I. program application is the application of various input conditions to rules and determining the resulting outputs. In the vast majority of applications, the output of a *single* "if . . . then . . . else . . . " rule is too insignificant to be of any practical value. The real value of the A.I. program is its ability to combine hundreds or even thousands of rules. Because the number of rules often grows into the thousands, the process of searching through them can become very lengthy. Much work has been done in the field of A.I. search strategies in an attempt to minimize the overall time needed to search through the various rules. A single universal search strategy does not exist, but several specialized search strategies tailored for specific types of A.I. applications have been developed. The key to developing an efficient search strategy is to break the rules down into groups or hierarchies which have common features. As one hierarchy is searched, an intermediate result is reached. This intermediate result is then transferred as an input to the next group to be searched. This hierarchical searching strategy works well for problems which can be broken down and solved in discrete segments. The novel search strategy developed for this application is discussed below.

Figure 9:
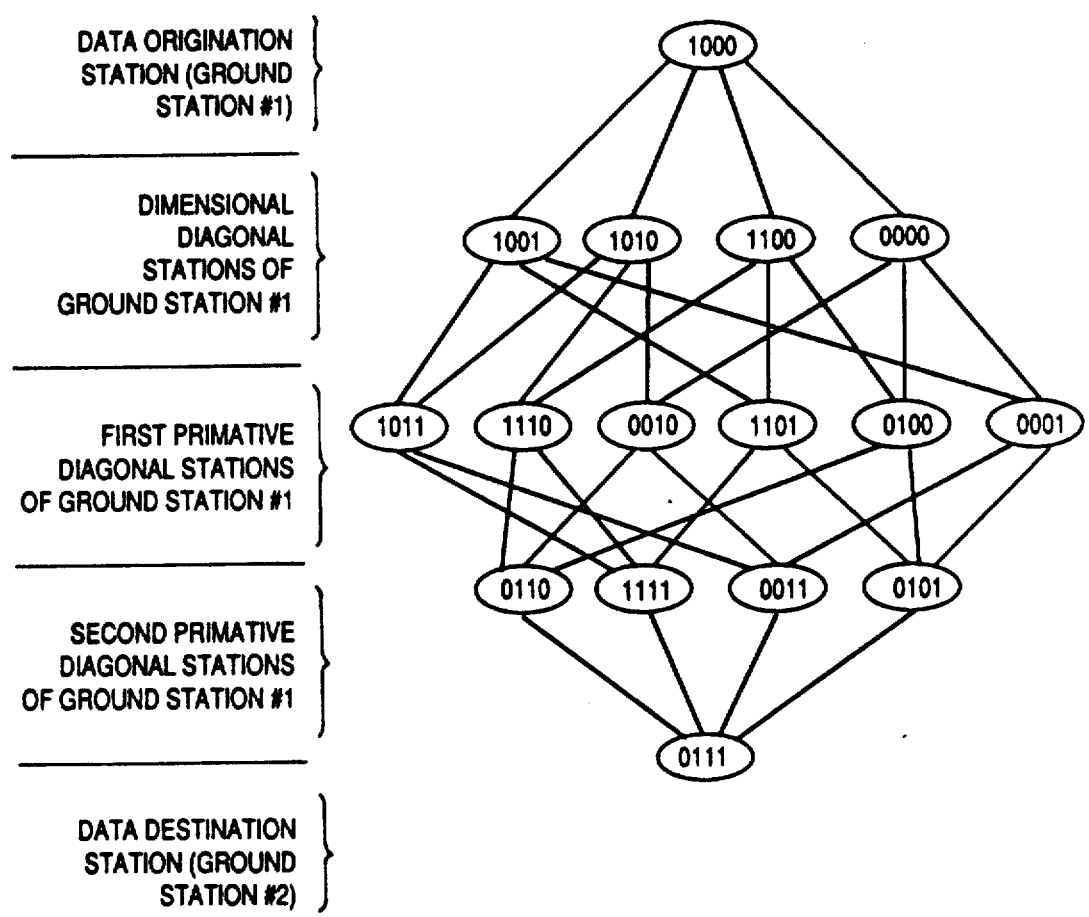
FIG. 9 is a view similar to FIG. 3 but emphasizing the various possible communication paths existing from station 1000 to 0111.

FIG. 9 is the same system of stations and dimensional diagonals as that shown in FIG. 3. It has been rearranged however to emphasize certain features. The uppermost station is ground station 1, and consequently has that station's address. The lowermost station is ground station 2, and is addressed accordingly. The four stations lying directly below station 1000 represent stations which share a dimensional diagonal with station 1000. This fact can also be seen by looking at the four immediate neighbors of station 1000 in FIG. 3. These four neighbors have the same address as the four stations lying directly below station 1000 in FIG. 9. The six stations which lie halfway between station 1000 and station 0111 are stations which share a first primitive diagonal with station 1000. Lastly, the four stations directly above station 0111 share a second primitive diagonal with station 1000. Only dimensional diagonals are shown in FIG. 9. For clarity, the first primitive and second primitive diagonals have been left our from FIG. 9, but assume they are implemented for the sake of this discussion. Assume that ground station #1 has a data packet that must be transmitted to ground station #2. Also assume that status information will travel on all implemented diagonals (dimensional, first primitive and second primitive), but data may be transmitted only along dimensional diagonals. There are twenty-four minimal paths the data can travel between station 1000 and its destination station 0111. One way to determine the best route is to collect the status of the fourteen neighboring stations, process all of the status information and determine which of the twenty-four possible paths is the best or optimum path, and then direct the data packet to the dimensional diagonal station that comprises the first link in the optimum path. From that station, a similar algorithm is used to determine which of the three immediate neighbors will receive and transmit the data packet. This process would continue until the data arrived at the destination station 0111. Although the above-described "brute force" search method will work with small networks, it fails to satisfy the needs of larger systems. As the number of network stations grows linearly, the number of brute force scheduling steps that must be executed increases exponentially, and the time needed to execute brute force search techniques likewise grows exponentially. At some point, this brute force searching approach can no longer function with sufficient speed to justify additional stations. The exponential growth phenomenon is often referred to as the combinatorial explosion problem. The disclosed control method overcomes the combinatorial explosion problem by using two novel techniques: 1) by limiting the amount of status information which any one station must process, regardless of the size of the network, and 2) by breaking the search strategy into different hierarchies so that the optimum network route may be determined in discrete steps, thereby eliminating the inefficiencies of the "brute force" search strategy. First, the superiority of the hierarchical search strategy will be demonstrated; after that, the limiting strategy will be explained.

Hierarchical Search Strategy

FIG. 9 was earlier used to show that there exists twenty-four possible minimal paths between station 1000 and station 0111. If the brute force search strategy was applied in an attempt to find the optimum route available between station 1000 and station 0111, station 1000 would have to 1) acquire status information from all fourteen intermediate stations, and 2) analyze that status information as it is applied to the twenty-four possible data paths. Suppose that the acquisition time required to collect and store the status information from the fourteen neighboring stations is negligible, but it takes $t_0$ seconds to evaluate each possible data path. Using the brute force method of evaluating every possible path, it would take station 1000 $24*t_0$ seconds to determine the optimum route. Instead of using the brute force method, the disclosed invention uses a hierarchical searching method which operates as follows. Suppose, again using FIG. 9, station 1000 has a data packet destined for station 0111. Station 1000 in an attempt to determine the optimum route, first examines the status of its four second primitive diagonal stations (i.e., stations 0110, 1111, 0011, 0101). Let us say that it takes station 1000 $4*t_0$ seconds to determine which of the four stations is best suited to handle future data transmissions. Let us also suppose that station 0101 is the best suited station to handle future data transmissions. Station 1000 has now reduced its scheduling problems by eighteen paths! By choosing which one of the four second primitive diagonal stations is best suited to perform additional data transmissions, eighteen out of the twenty-four possible paths no longer must be examined. Six possible paths remain. Station 1000 now compares the status of the three first primitive diagonal stations (i.e. 1101, 0100, 0001) that could direct a data transmission through station 0101. Suppose it takes $3*t_0$ seconds for station 1000 to determine that station 1101 is the best suited. We have narrowed the field, now, to only two possible choices—station 1001 or station 1100. Again, assume it takes station 1000 $2*t_0$ seconds to determine that station 1001 is the best candidate. We have determined an optimal path, using the hierarchical approach, and it has taken:

$$\begin{array}{r} 4*t_0 \text{ seconds} \\ 3*t_0 \text{ seconds} \\ + 2*t_0 \text{ seconds} \\ \hline 9*t_0 \text{ seconds} \end{array}$$

$9*t_0$ seconds. The brute force method took $24*t_0$ seconds. Although the differences between these two methods may not always work out to be precisely as shown, there remains no question regarding the superiority of the hierarchical search method over the conventional brute force method.

Information-Limiting Strategy

The information-limiting strategy also plays a large part in overcoming the combinatorial explosion problem. The following rationale discloses why this is true. Again, with the aid of FIG. 9, it can be seen that in a four-dimensional hypercube, where each station is using dimensional, first primitive and second primitive diagonals for the transfer of status information, each station must process the status information of fourteen of its neighbors. This is a very modest task given current computer technology. If a larger network is desired (e.g. 32 stations), each station would have to process the status information from twenty-five of its neighbors (again assuming that second primitive diagonals and all lower diagonals are used for status transmittal). It is important to note that in going from a four-dimensional hypercube to a five-dimensional hypercube, the number of network stations has doubled, but the number of neighboring station status information each station must process has increased only by approximately 75%. If a larger network is desired (e.g. 64 stations), the increased resulting status processing load on each station will only increase by approximately 64%. This modest increase in each station's status processing load in light of the two-fold increase in the total number of network stations is made possible by limiting the station-to-station status swapping to a manageable number of neighbors. When the transfer of status information is limited to only a select number of neighbors, the network is said to be locally compact. Conversely, when any network station can directly receive information from any other network station, the network is said not to be locally compact. The disclosed invention is locally compact and this feature is a major factor in allowing the decentralized control scheme herein disclosed to overcome the combinatorial explosion problem. Traditional centralized control schemes, however, are not locally compact, and consequently cannot be expanded beyond a given scope.

Figure 10A:
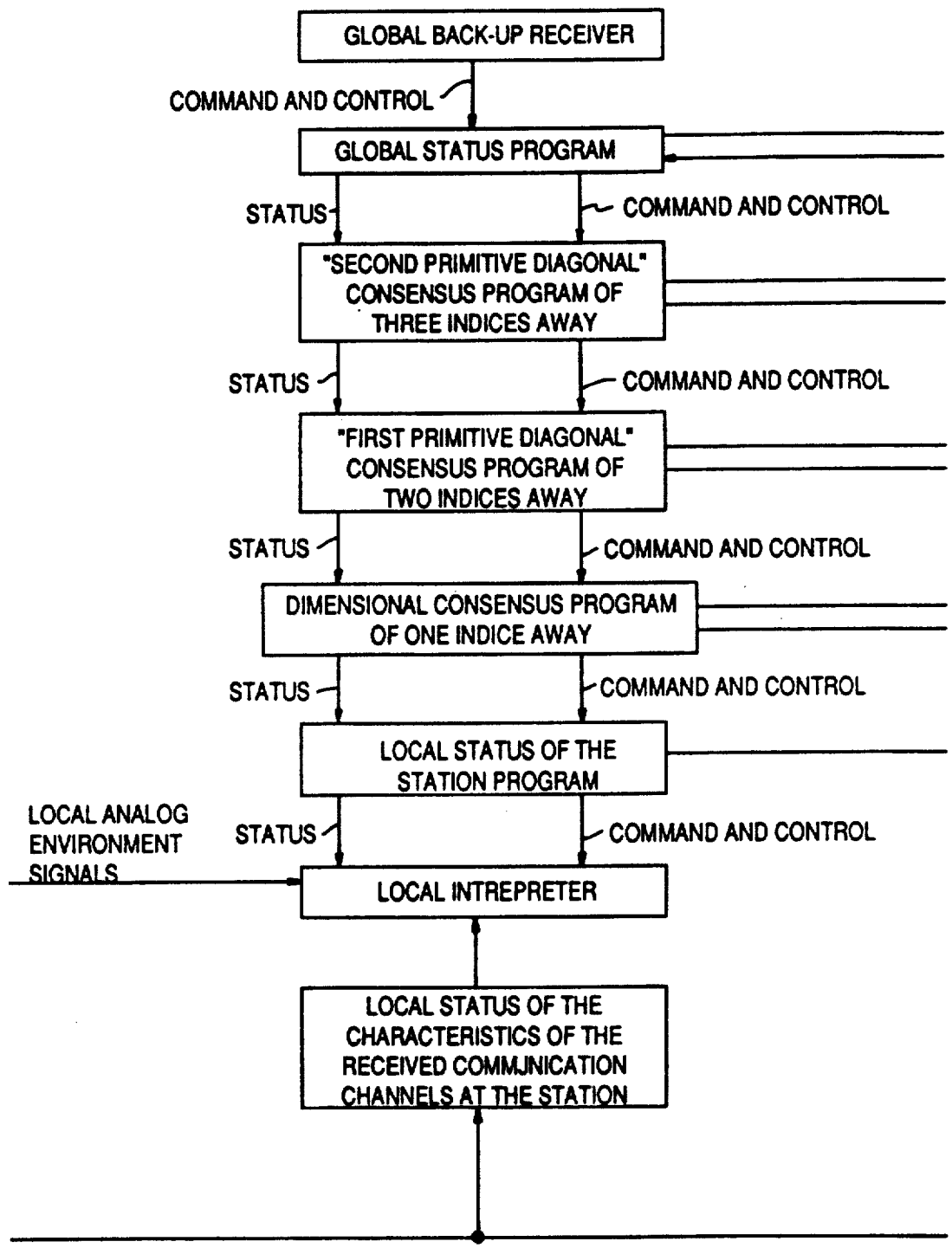
FIGS. 10a and 10b are an overall block diagram of the hierarchical organization of a network station.
Figure 10B:
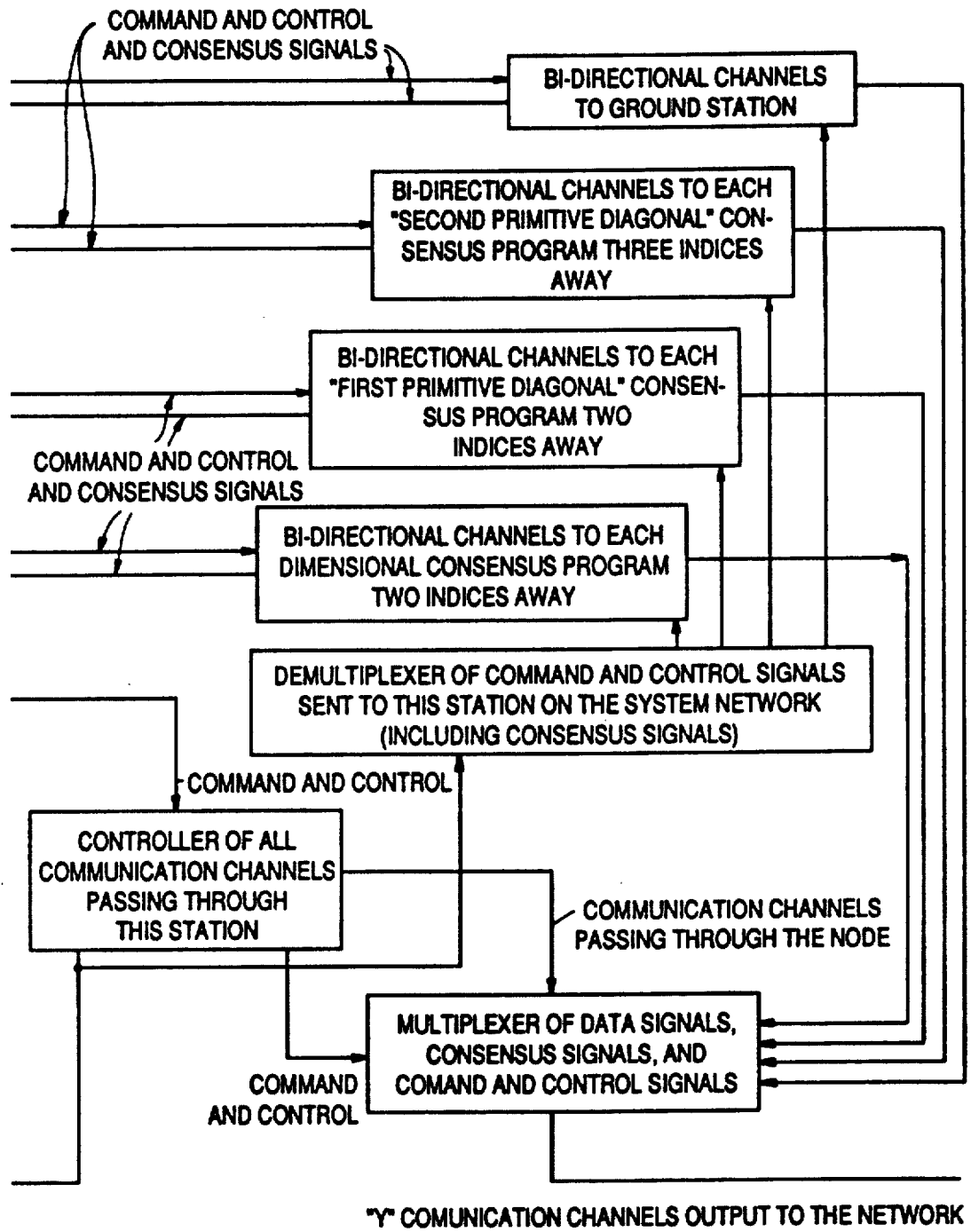

FIGS. 10a and 10b show a general block diagram of the hierarchical organization of a typical network station. FIGS. 10a and 10b assume that the control signals are transmitted and received by appending these signals to data transmission channels. FIGS. 10a and 10b also assume that data is transferred only along dimensional diagonals (but the disclosed invention can be used to transmit data along any number of higher order diagonals). A global back-up receiver is shown and would be used in only unusual circumstances. The discussion of the hierarchical search strategy or the other novel features of the disclosed invention is not affected by the manner in which control signals are transferred.

In general, there are two types of local conditions that affect the status of the local control program.

Broadly, these are the characteristics of the desired received channels (i.e. signal strength of the composite, one received channel strong relative to another received channel, etc.), and all other local conditions (such as temperature, self-check of the computer, etc.). In the diagram, these are shown as two signals where one is labeled "local analog environment signals" and the other comes from the box labeled "Local status of the characteristics of the received communication channels at the station." Of course, the later signal is derived from the input desired channels, labeled "X" communication channels input from the network. These two signals feed the "local interpreter" which conditions them to fit into a set of status signals that feeds the "local status of the station program." The "local status of the station program" commands the "local interpreter" to send it the information needed from the local conditions. The local status of the station program then processes the acquired information and commands the controller of the incoming signals to process and pass through the data channels onto the desired paths. The "local status of the station program" has all the capability that is needed to digitally control all the incoming data channels given that is has sufficient information. It gets this information from the hierarchical program structure of which the lowest level of this hierarchical structure is the "dimensional consensus program of one indice away."

To set the stage for the discussion of the next four hierarchical stages, it is probably helpful to point out that these four stages are ideal candidates for A.I. structures (i.e. each A.I. program is trained to do a set of specific tasks for a total of four trained A.I. programs). These four A.I.-type programs have at the lower hierarchical level the "dimensional consensus program of one indice away" with the next hierarchical level being "first primitive diagonal consensus program of two indices away" and with the next higher level of hierarchy being "second primitive diagonal consensus program of three indices away" and, finally, at the highest level of hierarchy, the "global status program."

Although the novel noncentralized communication scheme herein disclosed can be implemented using conventional programming languages, it is believed that the best way to implement the disclosed control scheme is by using A.I. programming techniques. The reason A.I. is believed to be the preferred approach is: 1) the local compactness of the disclosed invention, and 2) the consensus nature of the decision making. Since the inputs to these programs are finite and locally compact, the size of the searching problem can be made small enough such that the scheduling problem is tractable. Also, since the decisioning problem is a consensus type (i.e., if each program at a given hierarchical level at a given node can assume that there is a similar program at the same hierarchical level existing at the other nodes with which it communicates, then it can "trust" this other program to come to a similar decision), only look-up tables for a consensus output are needed.

A consensus program has as its inputs: 1) status from lower level programs, 2) command and control from higher level programs, and 3) the decisions (i.e. status) of the other consensus programs in its immediate "neighborhood." Using these inputs, the consensus program searches for an action or output that is most consistent with what every other program is doing, then it makes a decision and "tells" all of its "neighbors" what it has tentatively decided to do. By having neighboring stations swapping consensus information, each station can minimize the chance that it will make a routing decision that contradicts the routing consensus of the neighboring stations.

The command and control signals tell the particular consensus program what final result it wants accomplished, but leaves the consensus programs on a given hierarchical level to "decide" or sort out *how* that task is accomplished. This has very important implications as to the addressing structure of the high-level commands and control signals. In general, the high-level commands and control signals can be transmitted in parallel (similar to the way computer commands are transmitted over a bus structure) to neighboring stations. Then, all of the lower-level consensus programs set about trying to accommodate this request and at the same time honor previous requests.

As command and control signals move to a lower level in the hierarchical system, they become less of a *request* as to *what* is to be done and more of a direct order to do a particular task. Finally, the command and control signals fed to the "local status of the station program" become the familiar types of control signals that are common to communication design.

FIGS. 11a, 11b, 11c and 11d will now be used to unite the many novel features herein discussed into one example. Particularly described will be the self-allocating feature of the disclosed invention.

Figure 11A:
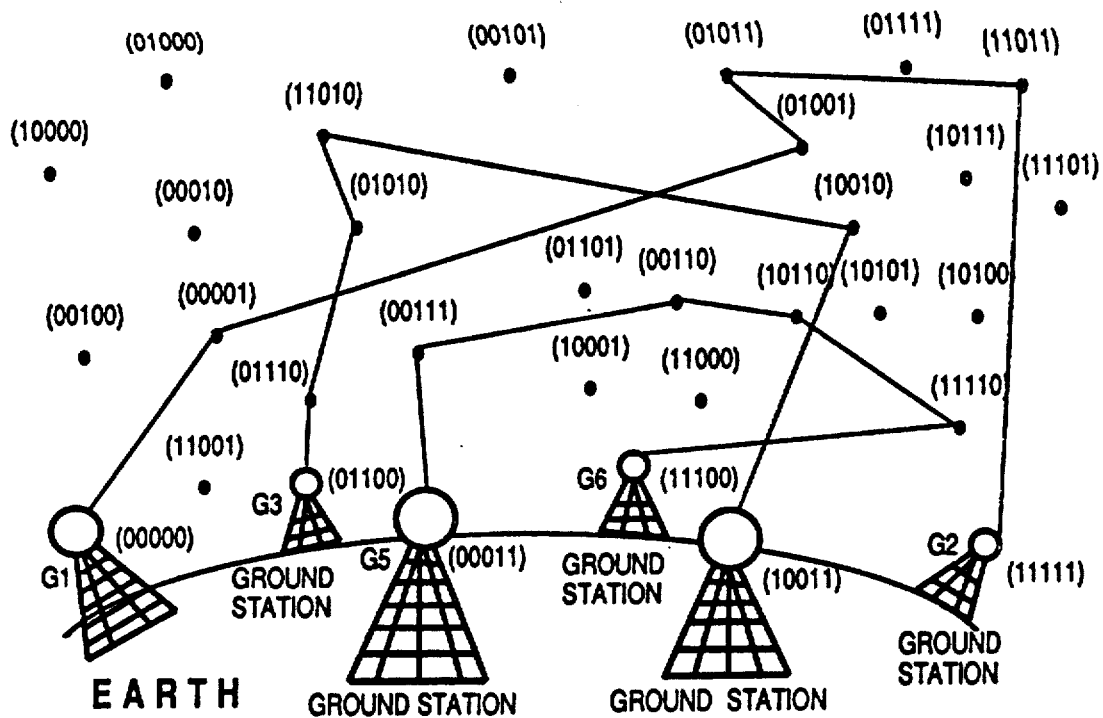
FIGS. 11A-11D are diagrammatic views of a satellite communication network configured to conform to a five-dimensional hypercube.

FIG. 11a is a model of a satellite communications network configured to conform to a five-dimensional hypercube. This model has six ground stations and twenty-six space stations (satellites). The following restrictions are to be applied to this system:

1) Data communications take place only between stations which share dimensional diagonals.

2) Status communications take place between stations which share dimensional, first primary and second primary diagonals.

Figure 11B:
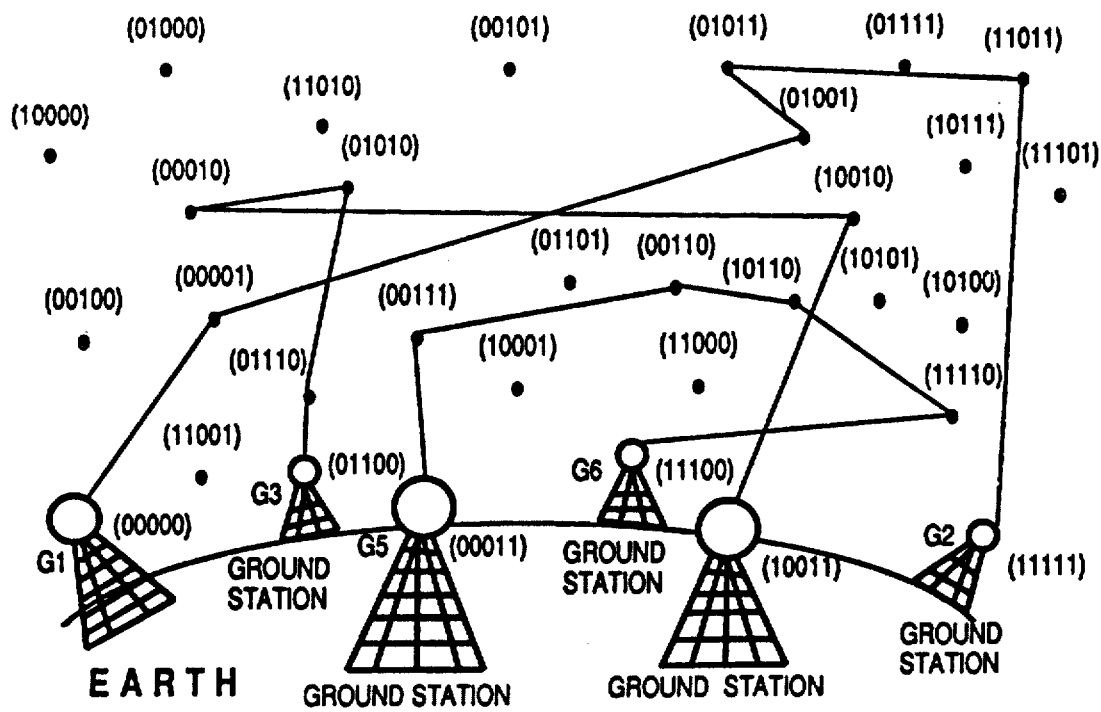

3) Ground stations may not directly communicate data or status information with other ground stations even if they satisfy conditions 1 or 2 above. Suppose communication has been established between the ground stations as shown by the solid lines in FIG. 11a. Namely, ground station #1 (GS1) has information to transfer to GS2 and is successfully doing so via the network stations: GS1 to satellite station 00001 (SS 00001) to SS 01001 to SS 01011 to SS 11011 to GS 11111. GS3 is transferring data to GS4 over the SS 01110 to SS 01010 to SS 11010 to SS 11010 satellite link. And GS5 is communicating with GS6 over the SS 00111 to SS 00110 to SS 10110 to SS 11110 link. Note that all of the active satellites are equally active or loaded, they each are processing one channel of data, and each are sending and receiving status information from twenty-five stations (i.e. 5 dimensional neighboring stations + 10 first primitive neighboring stations + 10 second primitive neighboring stations). Suppose the network in FIG. 11a becomes disrupted in the following way: SS 11010 becomes nonfunctional, or perhaps so loaded down with other transmission tasks (which are not shown) that it cannot reasonably handle the transmissions it is presently receiving from SS 01010. SS 01010 knows of SS 11010's reduced capacity because, according to our scheme, it is receiving status information from its dimensional neighbors. SS 01010 will now redirect its data communications so as to relieve the burden from the distressed (or inoperative) SS 11010. SS 01010 has two neighbors that it could call upon: SS 00010 or SS 01011. However, SS 00010 is the most likely candidate of the two because it is not presently transmitting any data (SS 01011 is being used in the GS1 to GS2 link). Since SS 01010 has knowledge of its neighbors' states of business, it can compare them and redirect the data to the least busy neighbor. The redirected communication is shown in FIG. 11b. The redirected communication of FIG. 11b demonstrates two important features of the disclosed invention:

1) automatic network adoption of an alternate data transmission path without the use of a central controller; and 2) selection of an alternate data transmission path such that the work load among stations is equalized.

Figure 11C:
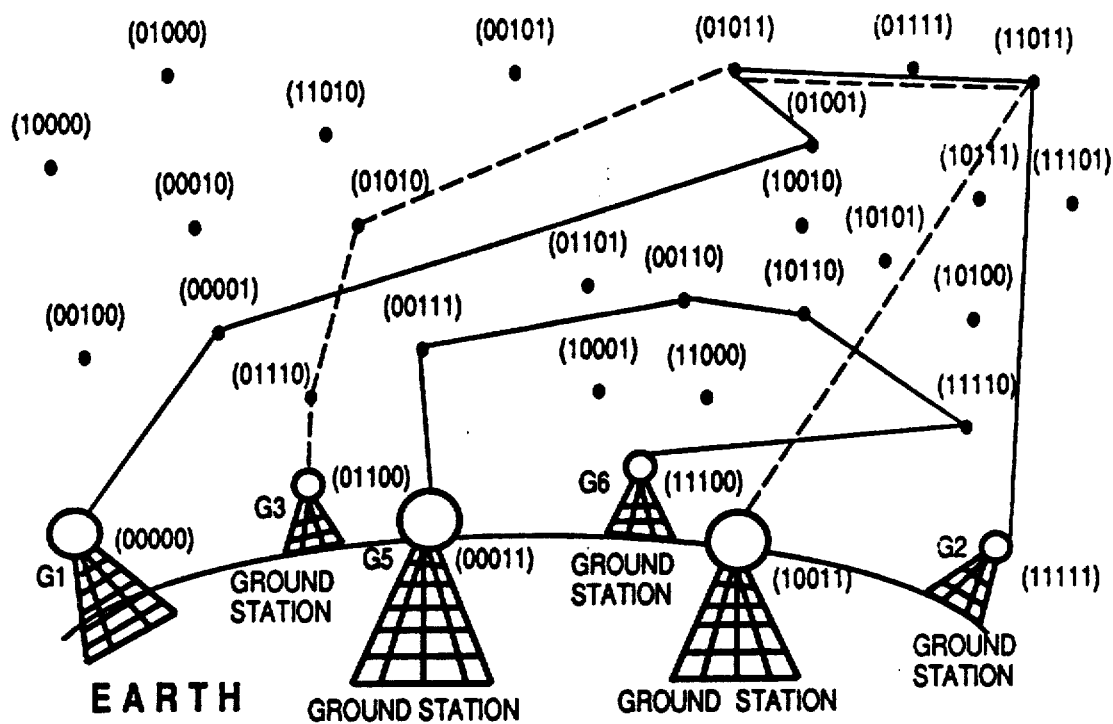
Figure 11D:
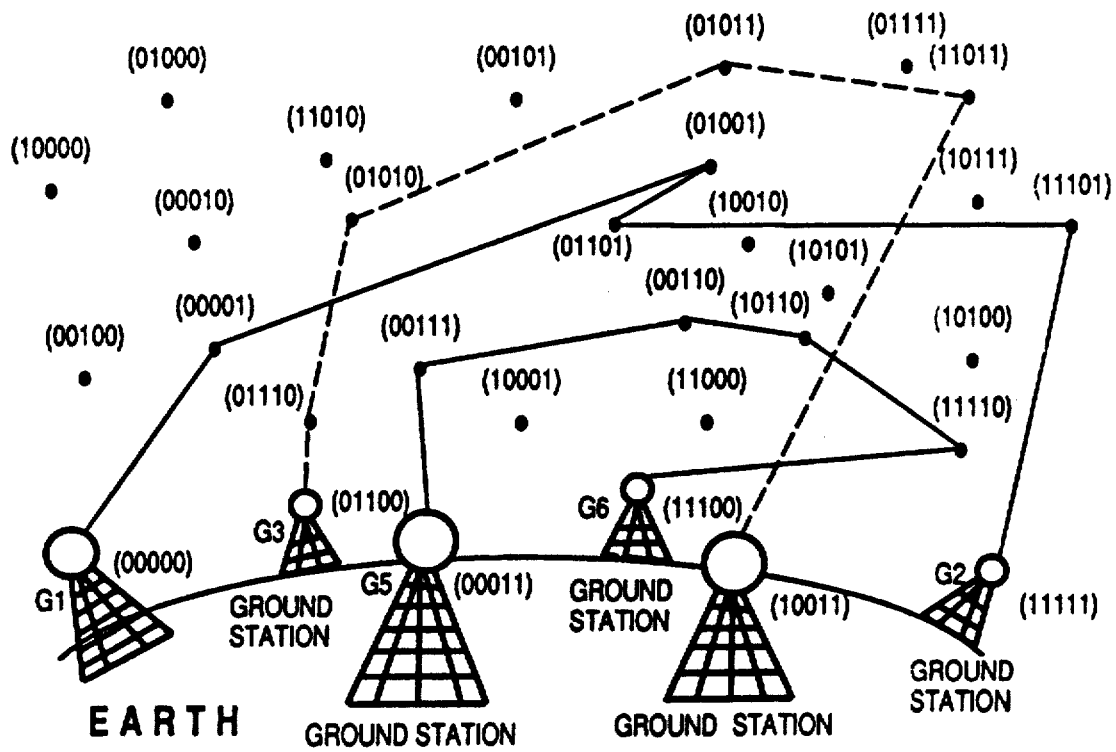

Again, using FIG. 11b, suppose that SS 11010 and SS 00010 both became nonfunctional. SS 01010 would have only one remaining choice—SS 01011. The new communications routing that would initially result is shown in FIG. 11c. However, because SS 01011 and SS 11011 are carrying a larger portion of the network load than the other stations, each station in the GS1 to GS2 link attempts to re-establish a more equally distributed data communications load so as to relieve SS 01011 and SS 11011 from the disproportionate burden they are now carrying. One possible solution (there are many) is shown in FIG. 11d. Here, the previous SS 01001 to SS 01011 to SS 11011 to GS2 link has been redirected to be SS 01001 to SS 01101 to SS 11101 to GS2. Now each station carries an equal communications burden.

The importance of using dimensional and higher order diagonals for feedback of status information will now be demonstrated. Suppose in FIG. 11d that four dimensional neighbors of SS 01011 were nonfunctional (i.e. SS 01111, SS 11011, SS 01001, GS5). If status information was confined to only dimensional diagonals, data transmissions would proceed from GS3 to SS 01110 to SS 01010. Station 01010 would be aware that SS 01011 has nowhere to send data, because SS 01011 would be transferring its status information to SS 01010, and consequently SS 01010 would route data around SS 01011. This scheme of feeding back status information on only dimensional diagonals will work under limited conditions, but as each station begins to handle more and more data channels, the network must be able to function under increasingly demanding conditions. If status information is swapped only between dimensional neighbors, a station's ability to make the best routing decision is not as good as it would be if it could know the status of its first and second primary diagonal neighbors. By knowing the status of its first and second primary diagonal neighbors each station can begin to deflect data around undesirable network stations earlier than it could if status information is swapped between only dimensional neighbors. For instance, in FIG. 11d, if GS3 desired to communicate with GS4, the communications link between them could be as shown by the dashed line. However, suppose that four of SS 01011's dimensional neighbors (i.e. SS 01111, SS 11011, SS 01001, GS5) were not functioning; the data would have to proceed from GS3 to SS 01110 to SS 01010 before any rerouting decision could be made. If SS 01110 would have had the status information from SS 01011's dimensional neighbors, it could have possibly avoided using SS 01010. Perhaps it would have been more advantageous for SS 01110 to send the data to SS 11110 instead of SS 01010. The important concept herein disclosed is that when higher order diagonals are used for the transfer of status information between stations, data bottlenecks and other undesirable network conditions can be quickly made known to a greater number of neighboring stations. The affected neighbors can then use this status information to anticipate problems and redistribute data communication flow so that no data "pile-up" occurs at or around the nonfunctioning or heavily burdened station. As higher-order dimensional diagonals are employed, the network becomes better equipped to exercise greater foresight in directing data flow.

The interface between the A.I. expert and the communications expert now becomes very clear because there are many trade-offs to be made. Similar trade-offs are necessary at the ground stations.

There is a final area in which the A.I. expert needs a great deal of interface with the communications expert and that is in the ground display area. In order to control and know the status of such a spacecraft network, a great deal of information has to be transmitted to the ground station. However, with so much information going to the ground station, there is a real problem of operator interpretation and use. It is expected that a great deal of this information will be presented graphically. However, straight graphical representations of this information would probably be useless. Hence, this graphical information must undergo a transformation such that efficient operator control may be achieved by commanding *the end result* wanted from the network and not by commanding exactly *how the network* is to accomplish this end.

Having thus described the invention, it may be appreciated, it may be appreciated that those skilled in the art may make various modifications or additions to the disclosed embodiment without departing from the spirit and scope of the present contribution to the art. Accordingly, it is to be understood that the protection sought and to be afforded hereby should be deemed to extend to the subject matter claimed and all equivalents thereof fairly within the scope of the invention.

I claim:

1. In a communication network of the type including a plurality of stations interconnected to one another characterized by a hypercube topology and wherein said stations comprise the nodes of the hypercube and communication means associated with each station enables communication between stations, a method of communicating data between two of said plurality of stations including the steps of:
   (a) within each station, defining a plurality of groups of neighboring stations, wherein each group of neighboring stations is characterized in that each station within one of said plurality of groups of stations shares an attribute;
   (b) within each station, generating status information indicative of the ability of that station to communicate within the network;
   (c) for each station, transmitting the status information generated in step (b) to at least one of said plurality of groups of neighboring stations defined in step (a);
   (d) for each station, receiving the status information transmitted in step (c) from at least one of said plurality of groups of neighboring stations defined in step (a);
   (e) within each station, creating a hierarchy of decision making levels wherein each decision making level is respectively associated with the information received from one of said groups of stations within said plurality of groups of neighboring stations;

(f) within each decision making level of each station, determining an optimum communications path within said network based upon the status information associated with that decision making level; and (g) within each station, combining the determinations made at each decision making level as defined in step (f) to arrive at a consensus as to which station within one of said neighboring groups of stations is best suited to receive data communications.

2. The method of claim 1, wherein step (a) further includes the substep of defining the attribute shared by each station within one of said groups of neighboring stations to be the network distance as defined by said hypercube topology between one of said stations within said network and each of the stations within one of said groups of neighboring stations.

3. The method of claim 1, wherein step (e) further includes the substep of:
for each station, assigning a priority level for each decision making level.

4. The method of claim 3, wherein step (g) further includes the substep of:
combining the determinations made in step (f) by weighing the priorities assigned to each decision making level.

5. The method of claim 4, further including defining said priority of each decision making level at least in part as a function of said common attribute.

6. The method of claim 5, further including the step of defining said attribute shared by each station within one of said groups of neighboring stations to be the network distance as defined by said hypercube topology between one of said stations within said network and each of the stations within one of said groups of neighboring stations.

* * * * *